United States Patent [19]

Tacquet

[11] 4,393,854
[45] Jul. 19, 1983

[54] MIXING UNIT

[76] Inventor: Maurice Tacquet, 14 Allee des Pres, F-59650 Villeneuve d'Ascq, France

[21] Appl. No.: 235,519

[22] Filed: Feb. 18, 1981

[30] Foreign Application Priority Data

Feb. 19, 1980 [FR] France ............................ 80 04386

[51] Int. Cl.³ .............................................. F02B 1/00
[52] U.S. Cl. .................... 123/576; 123/514; 123/515
[58] Field of Search ................................ 123/575–578, 123/514, 515

[56] References Cited

U.S. PATENT DOCUMENTS

| 2,208,444 | 7/1940 | Bailey | 137/78 |
| 2,424,723 | 7/1947 | Tate | 123/575 |
| 2,865,355 | 12/1958 | Hilton | 123/577 |
| 3,022,425 | 2/1962 | Rockstead | 123/577 |
| 3,415,264 | 12/1968 | Brown et al. | 137/92 |
| 3,977,427 | 8/1976 | Reed et al. | 137/334 |

FOREIGN PATENT DOCUMENTS

| 1217194 | 5/1960 | France . |
| 2228249 | 11/1974 | France . |
| 1388118 | 3/1975 | United Kingdom . |

Primary Examiner—Charles J. Myhre
Assistant Examiner—E. Rollins Cross
Attorney, Agent, or Firm—Spencer & Kaye

[57] ABSTRACT

An apparatus for supplying fuel to a combustion device has first and second tanks for storing light and heavy fuel, respectively, a third tank connected to the first and second tanks by first and second conduits, respectively, for supplying light and heavy fuel to the third tank, a third conduit connecting the third tank with the combustion device for supplying fuel from the third tank to the combustion device; a fourth conduit connecting the combustion device with the third tank for returning excess fuel from the combustion device to the third tank; a pump in the third conduit for driving fuel through the third and fourth conduits. The pump has an output flow rate that is greater than the rate of fuel consumption of the combustion device. The apparatus further has a first valve arranged in the first conduit for controlling the fuel flow therethrough; a second valve in the second conduit for controlling the fuel flow therethrough; a viscosity sensor connected to the fourth conduit for sensing the viscosity of the fuel flowing therethrough; and a control arrangement connecting the viscosity sensor with at least one of the valves for changing the ratio of the rates of fuel flowing in the first and second conduits in response to signals from the viscosity sensor for maintaining the viscosity of the fuel in the third tank and in the third conduit at a predetermined value.

5 Claims, 3 Drawing Figures

MIXING UNIT

BACKGROUND OF THE INVENTION

The invention relates to a device for the supply and viscosity regulation of fuel, intended for use particularly in thermal engines.

The thermal engines are often designed and fed so as to run on light fuel during starting and at low load, and on heavy fuel oil at nominal speed.

Usually, for light fuel feed, a simple piping directly connects the corresponding tank to the engine injection device.

On the contrary, as regards heavy fuel oil, before it reaches the engine injection device, its viscosity must be corrected. Indeed, the heavy fuel oil can reach a very high viscosity and if this fuel was brought unmodified to the engine injection device, the pressures which should be applied for its injection would destroy the injection device.

It is known to correct the viscosity of the heavy fuel oil by more or less intense heating, under the control of a viscosimetric device.

Because of its heterogeneousness, however, the heavy fuel oil reaching the heating device has a viscosity which very often and suddenly varies considerably. Thus, the correction determined by the viscosimetric device very often risks to be irrelevant to the correction which has become necessary, thus resulting in very uncertain running conditions.

Further, because the above-noted adjustment of viscosity is effected exclusively through temperature, changes the fuel reaches the engine with widely variable temperatures. Moreover, during the change over from light fuel feeding to heavy fuel feeding, as well as during the change back to light fuel the engine must run in an intermediate stage during which it is generally not possible to monitor the temperature and the viscosity of the blend. It was found that during these intermediate stages malfunction may occur: the rapid temperature variation of the fuel called 'thermal shock' causes blocking of the injection pumps and the abnormal increase of viscosity during short periods damages the injection equipment and the camshafts. According to another known method, the fuel viscosity is corrected, besides heating, by blending both fuels in proportions which can be modified according to the data which a viscosimetric device transmits to an electric or electronic arrangement determining the new proportion and/or setting the same by adjusting the flow in at least one of the two pipes which carry the heavy fuel oil and the light fuel respectively. Such a method is disclosed in U.S. Pat. No. 3,415,264.

For such a flow regulation in known constructions, each pipe must pass through a separate pump, one of which, at least, either has a variable output or is rotated by a variable-speed engine.

Apart from the fact that such pumps are very expensive and prevent a gravity flow of the fuel in case of shut down of their motor, when both pumps are acted upon at the same time, the new proportion is difficult to determine and, when only one pump is acted upon, the possibilities of blend modification are limited.

SUMMARY OF THE INVENTION

It is an object of the invention to provide an improved device for fuel feeding and viscosity regulation which is simple, cheap and nevertheless very efficient, in order to ensure a perfectly controlled viscosity complying with the real needs of the engine.

This object and others to become apparent as the specification progresses, are accomplished by the invention, according to which, briefly stated, The device burning fuel is fed in excess by a common tank which is supplied with light and heavy fuel, taken from their own tank by respective pipes in each of which the flow is only controlled by one of two valves both of which together supply the tank only with the fuel volume effectively combusted.

At the outlet of the common tank, in a piping leading to the device burning the fuel, the circulation of fuel is ensured by a pump which, contrary to the output of both valves together, has a higher output than the volume of fuel burnt.

The excessive output is returned to the common tank.

DESCRIPTION OF THE PREFERRED EMBODIMENTS

Figure 1:
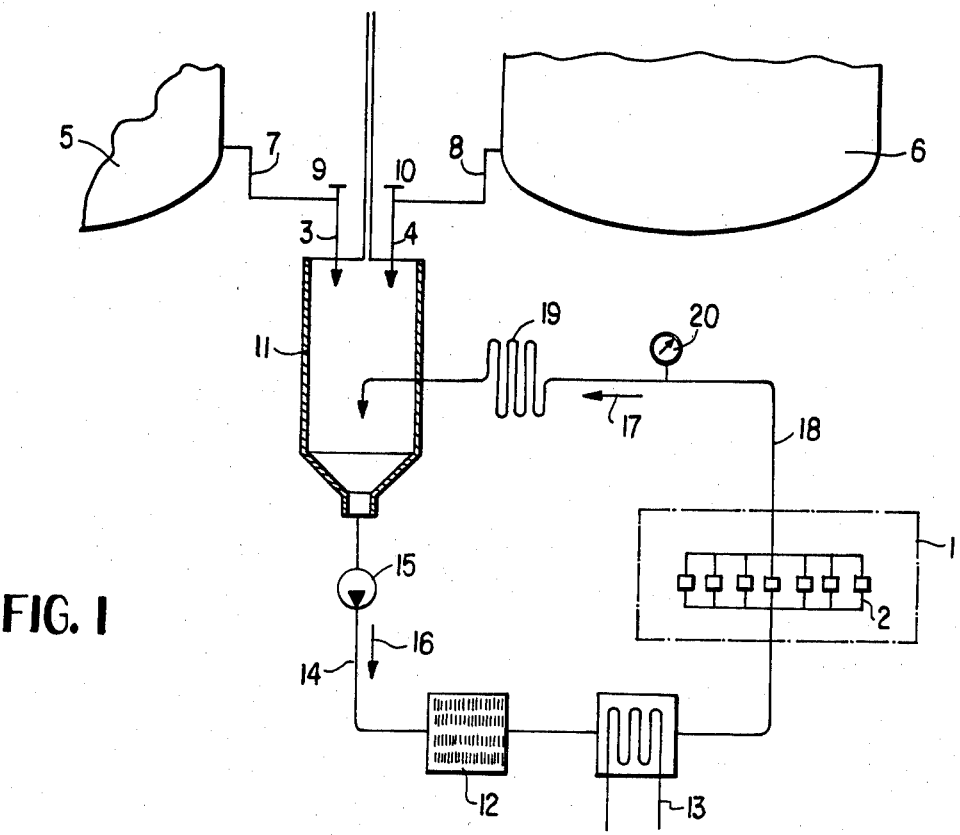
FIG. 1 is a schematic view of a preferred embodiment of the invention adapted for manual control.

Referring to FIG. 1, there is shown a thermal engine/having an injection device 2 whose pumps are fed from a common tank 11. The latter is fed with light fuel and/or heavy fuel from their own tank 5, 6 by a piping 7, 8 in each of which the output is controlled by a respective valve 9, 10 which can be of any known type, such as a plug valve or a throttle valve.

The valves 9, 10 only supply the tank 11 with the equivalent of the volume effectively combusted.

Only at the outlet of the common tank 11, is, in a piping leading to the injection device 2, the fuel circulation ensured by a pump (pump 15) and contrary to the combined output of valves 9, 10 the output 16 of the pump 15 is higher than the consumption of the engine 1.

Then, the excess fuel passes through the injection device 2 and is reintroduced into the common tank 11 by means of a pipe 18. With the pipes 14 and 18, the injection device 2 of the engine and the common tank 11 are connected in a loop circuit in which the fuel circulation is ensured by the pump 15.

The loop circuit is also fitted with a heating device 13 in order to adjust the fuel temperature.

The loop circuit is further fitted with a device giving data on the viscosity of the fuel which flows in it. Such a device may comprise, in the return pipe 18, a laminar flow generating element 19. The laminar flow generates a load loss which is proportional to the fuel viscosity and which, measured for example with a manometer 20, makes it possible to detect the variations of viscosity. However, the device supplying data on the viscosity can also be shunted on the return pipe 18 so as to obtain the information from a sample taken at the pipe output.

Although the action of the pump 15 and heater 13 should be sufficient to ensure a good homogeneity, the loop circuit can be fitted with a device 12 for fuel mixing.

Because of the consumption of the engine 1, the fuel level in the tank 11 drops and controls the resupply, equivalent to the fuel consumption. The resupply is formed of light fuel 3 and/or heavy fuel 4 according to the viscosity variations, and in the described example, according to the load losses generated by the viscosimetric element 19.

By virtue of a variation of the percentage of the light or heavy fuel make up, the viscosity of the fuel which feed the injection device is kept unchanged even if the viscosity of the or the fuel temperature varies. Thus, the heating device is only used for the adjustment of the temperature at a value determined beforehand according to the fuel required.

The above-described apparatus has numerous advantages. Thus:

After starting the system with light fuel, it is sufficient to switch on the heating of the fuel of the loop 16, 17, 18 so that the viscosity of the blend tends to decrease and the proportion of the heavy fuel oil make up increases up to its optimum value according to the adjusted temperature. Before the engine shut down, the change back to light fuel is also effected gradually and with a constant viscosity. Thus, the change over from one fuel to another takes place progressively, without thermal shock or viscosity variation at the injection device.

Further, in case the thermal engine, instead of operating alternately with light and heavy fuels, should run exclusively on an intermediary fuel, the apparatus of the invention according to the adjusted temperature, will determine the percentage of the heavy and light fuel necessary to obtain the intermediary fuel chosen without requiring a special storage of intermediary fuel. Thus, the risk of deficiencies in the homogeneousness of the intermediary fuel is eliminated.

This advantage is particularly of significance for the installations of auxiliary engines on board vessels when the main engines are burning very heavy fuels.

Figure 2:
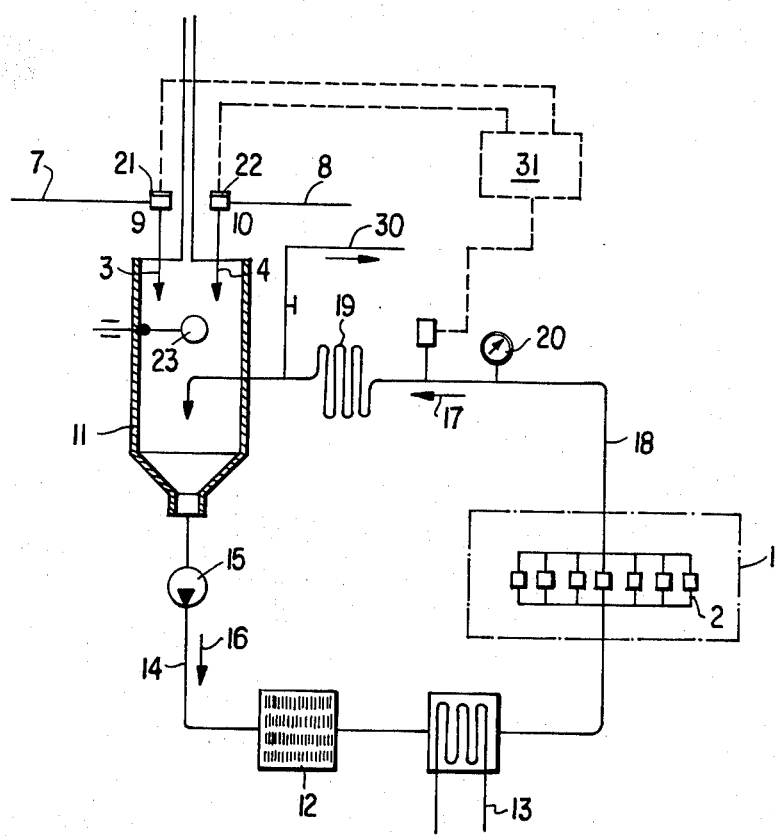
FIGS. 2 and 3 are further preferred embodiments of the invention adapted for automatic control.
Figure 3:
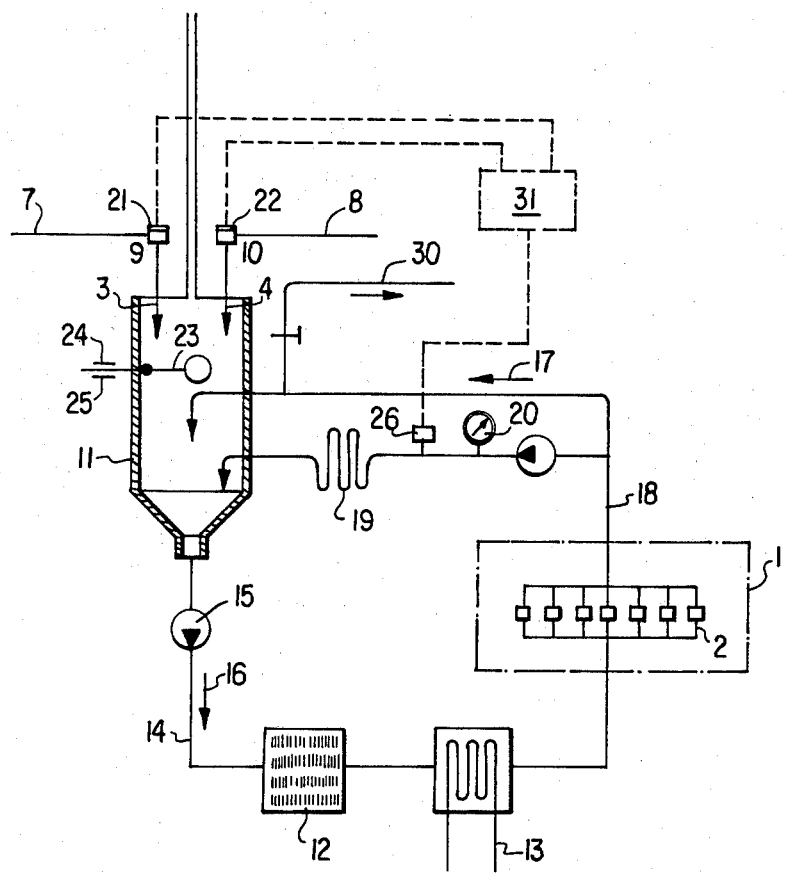

Turning now to FIGS. 2 and 3, the device can very easily be automatized, for example, by using solenoid valves 21,22 controlling the output of the pipes 7 and 8, in response to a level float 23 with contacts 24, 25 and/or a pressure switch 26.

FIG. 3 shows another embodiment of the invention in which the device giving data on viscosity is fitted in shunt of the return pipe 18.

The device can also be fitted with standy-by means which will ensure operation, for example, in case of power failure. For this purpose, the solenoid valve 21 may be the normally open type, so that in case of power failure the level of the light fuel increases in the degassing pipe, until it becomes balanced with the level of the light fuel tank. In this manner the engine supply is ensured as standby by the manometric height of the light fuel.

The stand-by (backup) operation can also be ensured by stand-by circuits fed by stand-by pumps.

The apparatus according to the invention can also include safety devices so that, in case of emergency stop of the engine, a circuit rinsing is ensured by a circuit 30, thus ensuring the replacement of the heavy fuel flowing in the loop by light fuel which facilitates repairs and a subsequent restarting.

If the viscosimetric element is fitted in the loop and the whole output of the return pipe 18 passes therethrough, the circulation pump 15 can be set at such an output value that it is only slightly higher than the engine consumption, so that the output in the viscosimetric element is greatly influenced by the real consumption of the engine, that is, its instantaneous power. Thus, the device becomes a device with variable viscosity operating as a function of the power developed by the engine.

The automation of the device can be enhanced by an automation device 31 in order to ensure a proportional control of the make up fuel quantities and to obtain a very great accuracy of the viscosity.

For example, if the valves open completely or not at all and as they are adjusted to obtain the same output, for each request for make-up fuel quantities in the common tank, both valves may be caused to open successively for a fixed total time corresponding to a certain make-up fuel quantity.

In order to adjust the make-up fuel quantities, the moment of change over from one valve to the other has to be adjusted.

Thanks to the common tank 11 and recycling carried out therein, the influence of a variation of viscosity on the consumed blend is delayed, which gives time for regulation to intervene.

I claim:

1. An apparatus for supplying fuel to a combustion device, comprising in combination:
   (a) a first tank for storing light fuel;
   (b) a second tank for storing heavy fuel;
   (c) a third tank;
   (d) a first conduit connecting said first tank with said third tank for supplying light fuel from said first tank to said third tank;
   (e) a second conduit connecting said second tank with said third tank for supplying heavy fuel from said second tank to said third tank;
   (f) a third conduit connecting said third tank with said combustion device for supplying fuel from said third tank to said combustion device;
   (g) a fourth conduit connecting said combustion device with said third tank for returning excess fuel from said combustion device to said third tank;
   (h) a pump in said third conduit for driving fuel through said third and fourth conduits; said pump having an output flow rate that is greater than the rate of fuel consumption of said combustion device;
   (i) a first valve in said first conduit for controlling the fuel flow therethrough;
   (j) a second valve in said second conduit for controlling the fuel flow therethrough;
   (k) a viscosity sensing means connected to said fourth conduit for sensing the viscosity of the fuel flowing therethrough and
   (l) control means connecting said viscosity sensing means with at least one of said valves for changing the ratio of the rates of fuel flowing in said first and second conduits in response to signals from said viscosity sensing means for maintaining the viscosity of the fuel in said third tank and in said third conduit at a predetermined value.

2. An apparatus as defined in claim 1, further comprising level sensing means connected to said third tank and to said valves for regulating the total flow rate through said first and second conduits such that said total flow rate equals the rate of fuel consumption of said combustion device.

3. An apparatus as defined in claim 1, further comprising a rinsing circuit connected to said fourth conduit for replacing, in case of emergency, the heavy fuel flowing in said third and fourth conduits by light fuel.

4. An apparatus as defined in claim 1, wherein said third and fourth conduits and said third tank form a loop in which fuel circulates, further comprising heating means contained in said loop for heating the fuel flowing therethrough.

5. An apparatus as defined in claim 4, wherein said heating means is connected to said third conduit.

* * * * *